United States Patent
Li et al.

(10) Patent No.: US 10,380,995 B2
(45) Date of Patent: Aug. 13, 2019

(54) METHOD AND DEVICE FOR EXTRACTING SPEECH FEATURES BASED ON ARTIFICIAL INTELLIGENCE

(71) Applicant: BAIDU ONLINE NETWORK TECHNOLOGY (BEIJING) CO., LTD., Beijing (CN)

(72) Inventors: Chao Li, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/854,150

(22) Filed: Dec. 26, 2017

(65) Prior Publication Data
US 2018/0277096 A1  Sep. 27, 2018

(30) Foreign Application Priority Data
Mar. 21, 2017  (CN) .......................... 2017 1 0168998

(51) Int. Cl.
| | |
|---|---|
| G10L 15/00 | (2013.01) |
| G10L 25/00 | (2013.01) |
| G10L 15/02 | (2006.01) |
| G06N 3/08 | (2006.01) |
| G10L 25/18 | (2013.01) |
| G10L 15/16 | (2006.01) |

(52) U.S. Cl.
CPC .............. *G10L 15/02* (2013.01); *G06N 3/08* (2013.01); *G10L 15/16* (2013.01); *G10L 25/18* (2013.01)

(58) Field of Classification Search
CPC ........... G06N 3/08; G10L 15/02; G10L 15/16; G10L 25/18
USPC .................................................. 704/232, 321
See application file for complete search history.

(56) References Cited

U.S. PATENT DOCUMENTS

| | | | |
|---|---|---|---|
| 9,892,344 B1 * | 2/2018 | Tran | G06K 9/66 |
| 2016/0322055 A1 * | 11/2016 | Sainath | G10L 15/16 |
| 2017/0103752 A1 * | 4/2017 | Senior | G10L 15/16 |
| 2017/0278513 A1 * | 9/2017 | Li | G10L 15/16 |

(Continued)

OTHER PUBLICATIONS

Wang, "Research on Audio Feature Extraction and Context Recognition Based on Deep Neural Networks," Dissertation for the Master Degree in Engineering, Harbin Institute of Technology, Jul. 2015, 56 pages.

(Continued)

*Primary Examiner* — Khai N. Nguyen
(74) *Attorney, Agent, or Firm* — Hodgson Russ LLP (57) ABSTRACT

Embodiments of the present disclosure provide a method and a device for extracting speech features based on artificial intelligence. The method includes performing a spectrum analysis on a speech to be recognized to obtain a spectrum program of the speech to be recognized; and extracting features of the spectrum program by using a gated convolution neural network to obtain the speech features of the speech to be recognized. As the spectrum program can describe the speech to be recognized in a form of image, and the gated convolution neural network is an effective method for processing images, the speech features extracted with this method may accurately describe characteristics of the speech.

20 Claims, 8 Drawing Sheets

(56) References Cited

U.S. PATENT DOCUMENTS

2018/0025721 A1* 1/2018 Li .......................... G10L 15/16
704/232
2018/0113649 A1* 4/2018 Shafiee Ardestani .......................
G06F 3/0613
2018/0121805 A1* 5/2018 Stone ................... G06K 9/4628
2018/0277096 A1* 9/2018 Li .......................... G10L 15/02

OTHER PUBLICATIONS

Dauphin et al., "Language Modeling with Gated Convolutional Networks," Cornell University, arXiv:1612.08083 [cs. CL], Dec. 2016, 8 pages.

Varior et al., "Gated Siamese Convolutional Neural Network Architecture for Human Re-Identification," Cornell University, arXiv:1607.08378v2 [cs.CV], Sep. 26, 18 pages.

SIPO, First Office Action for CN Application No. 201710168998, Mar. 22, 2019.

\* cited by examiner

METHOD AND DEVICE FOR EXTRACTING SPEECH FEATURES BASED ON ARTIFICIAL INTELLIGENCE

CROSS-REFERENCE TO RELATED APPLICATIONS

This application is based on and claims priority to Chinese Patent Application No. 201710168998.X, filed on Mar. 21, 2017, the entire contents of which are incorporated herein by reference.

TECHNICAL FIELD

The present disclosure relates to the field of speech recognition technology, and more particularly, to a method and a device for extracting speech features based on artificial intelligence.

BACKGROUND

Artificial Intelligence (short for AI) is a new technical science studying and developing theories, methods, techniques and application systems for simulating, extending and expanding human intelligence. The artificial intelligence is a branch of computer science, which attempts to know the essence of intelligence and to produce an intelligent robot capable of acting as a human. The researches in this field include robots, speech recognition, image recognition, natural language processing and expert systems, etc. The speech recognition is a most important aspect of the artificial intelligence.

According to speech recognition methods in related arts, a speech is recognized or classified by inputting the speech into a speech recognition network. However, as generally there is no specific layer for extracting speech features in the speech recognition network in related arts, a full connect layer plays a similar role in extracting the speech features. Since the speech features are important for describing characteristics of the speech, an accuracy of speech recognition is therefore relatively low due to an absence of an impactful extraction of the speech features in related arts.

SUMMARY

Embodiments of the present disclosure provide a method for extracting speech features based on artificial intelligence. The speech features are used for speech recognition. The method includes:

performing a spectrum analysis on a speech to be recognized, to obtain a spectrum program of the speech to be recognized; and extracting features of the spectrum program by using a gated convolution neural network to obtain the speech features of the speech to be recognized.

The gated convolution neural network includes a plurality of convolutional layers, a pooling layer is connected at behind of each of the plurality of convolutional layers; each of the plurality of convolutional layers includes at least two layers, an output of a former of the at least two layers is an input of an adjacent posterior of the at least two layers, each of the at least two layers includes a first channel and a second channel, and the first channel and the second channel employ different non-linear activation functions.

Embodiments of the present disclosure provide a device for extracting speech features based on artificial intelligence. The device includes: a processor; a memory, and computer programs stored in the memory and executable by the processor. When the computer programs are executed by the processor, the above method is achieved.

Embodiments of the present disclosure provide a non-transitory computer readable storage medium with computer programs stored. When the computer programs are executed by a processor, the above method is achieved.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serve to explain the present disclosure, and are not construed to limit embodiments of the present disclosure.

A method and a device for extracting speech features based on artificial intelligence according to embodiments of the present disclosure will be described with reference to the drawings.

Figure 1:
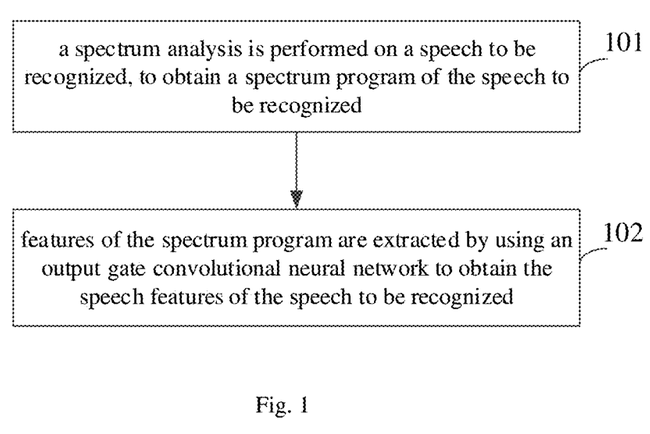
FIG. 1 is a flow chart illustrating a method for extracting speech features based on artificial intelligence according to embodiments of the present disclosure.

FIG. 1 is a flow chart illustrating a method for extracting speech features based on artificial intelligence according to embodiments of the present disclosure.

As illustrated in FIG. 1, the method includes followings.

At act 101, a spectrum analysis is performed on a speech to be recognized, to obtain a spectrum program of the speech to be recognized.

In detail, a Fourier transform is performed to each of voice frames included in the speech to be recognized to obtain spectrum values of the voice frames. Furthermore, the spectrum program is generated according to the spectrum values. Horizontal coordinates of the spectrum program represent time corresponding to the voice frames, longitudinal coordinates of the spectrum program represent frequency components corresponding to the voice frames, and values of intersections between horizontal coordinates and longitudinal coordinates represent the spectrum values (i.e. energies).

Further, before the Fourier transform is performed to each of the voice frames included in the speech to be recognized, it is required to sample the speech to be recognized by a preset sampling period to obtain the voice frames. Then, the voice frames are filtered with a filter group having the preset number of filters to obtain spectrum components of the voice frames.

Figure 2:
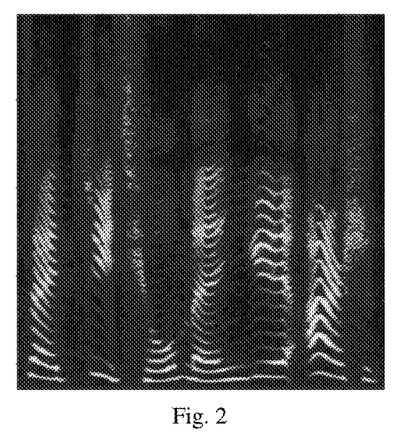
FIG. 2 is a schematic diagram illustrating a spectrum diagram.

For example, the framing and winding is performed on the speech to be recognized to obtain the voice frames, such as a window length of the windowing and framing is for example 25 milliseconds and a frame shift between adjacent frames is for example 10 milliseconds. In other words, the speech is divided every ten milliseconds to obtain the voice frames. After the windowing and framing is performed on the speech, the Fourier transform is performed to each of the voice frames to obtain frequency amplitudes, such as 257 frequency amplitudes. Then filtering is performed on the frequency amplitudes. For instance, the filter group having 40 dimensions may be used to filter the voice frames for example every 10 ms, thus obtaining a vector with 40 dimensions. Each component included in the vector corresponds to one of the spectrum components. For a piece of speeches, after the Fourier transform is performed according to the spectrum components of each of the voice frames to obtain the spectrum value of each of the voice frames, the spectrum program is plotted according to the spectrum values of the voice frames. FIG. 2 is a schematic diagram illustrating a spectrum program. As illustrated in FIG. 2, the horizontal coordinates denote time corresponding to the voice frames, and the longitudinal coordinates denote frequency components of the voice frames. The values of intersections between the horizontal coordinates and the longitudinal coordinates denote the spectrum values.

At act 102, features of the spectrum program are extracted by using a gated convolution neural network to obtain the speech features of the speech to be recognized.

In detail, during a process of plotting the spectrum program, the piece of speeches is described in a form of image. In the act S102, the features of the spectrum program are extracted through the gated convolution neural network. The features extracted are the speech features.

In order to clearly illustrate embodiments, the gated convolution neural network used in embodiments is simply described.

The gated convolution neural network includes a plurality of convolutional layers. A corresponding pooling layer is connected at behind of each convolutional layer. The pooling layer is configured to perform a down-sampling in time domain and/or in frequency domain. Each convolutional layer of the gated convolution neural network is composed of Database Availability Groups (DAGs). Each convolutional layer includes at least two layers. An output of a former layer of the at least two layers is an input of an adjacent posterior layer of the at least two layers. Each layer of the at least two layers includes a first channel and a second channel. The first channel and the second channel employ different non-linear activation functions. The non-linear activation function of the first channel is a hyperbolic tangent function tan h, and the non-linear activation function of the second channel is a sigmoid function. Each convolutional layer is provided with the non-linear activation function. Convolution kernels of the convolutional layers have the same size. The number of filters included in a posterior convolutional layer is integer multiple of that of an adjacent former convolutional layer.

It should be noted that, for each pooling layer, a summed down-sampling rate in time domain should be smaller than that in frequency domain. That is to say, for each pooling layer, a summed sampling rate in time domain should be greater than that in frequency domain.

During the process of plotting the spectrum program, the down-sampling is performed to the speech in time domain (i.e. the speech is sampled by the preset sampling period to obtain the voice frames). Therefore, when the down-sampling is performed by the gated convolution neural network, the sampling period is further enlarged. In order to make the sampling rate in time domain to match with the sampling rate in frequency domain during both the process of plotting the spectrum program and a process of extracting features through the gated convolution neural network, the summed down-sampling rate in time domain should be smaller than the summed down-sampling rate in frequency domain, for each pooling layer.

In order to achieve a good effect of speech recognition, the summed down-sampling rate in time domain should be determined according to a granularity of performing a speech classification on the speech to be recognized. If the summed down-sampling rate in time domain does not match with the granularity of performing the speech classification, the effect of speech recognition may be poor. In detail, generally a frame shift used in the speech recognition is 10 ms, that is, the sampling period is 10 ms. After the down-sampling is performed in time domain for the pooling layer, the sampling period is enlarged. If the granularity of performing the speech classification is a phoneme, it is appropriate to perform a summed down-sampling rate of ¼ in time domain for each pooling layer. While if the granularity of performing the speech classification is a word, it is appropriate to perform the summed down-sampling rate of ⅛ in time domain for each pooling layer.

In embodiments, by performing the spectrum analysis to the speech to be recognized, the spectrum program of the speech to be recognized is obtained; and by extracting the features of the spectrum program through using the gated convolution neural network, the speech features are obtained. As the spectrum program can describe the speech to be recognized in a form of image, and the gated convolution neural network is an effective method for processing images, the speech features extracted with this method may accurately describe characteristics of the speech. By performing the speech recognition to the extracted speech features, it may solve a technical problem that an accuracy of speech recognition is relatively low due to an absence of an impactful extraction of the speech features in related arts.

Figure 3:
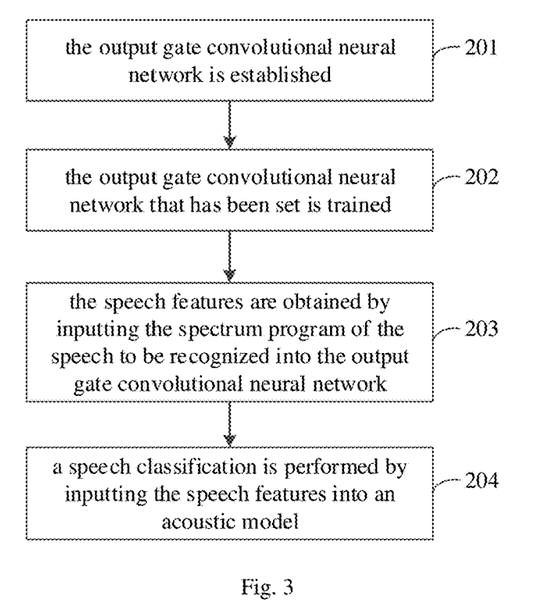
FIG. 3 is a flow chart illustrating another method for extracting speech features based on artificial intelligence according to embodiments of the present disclosure.

In order to clearly illustrate above embodiments, embodiments of the present disclosure provide another method for extracting speech features based on artificial intelligence. FIG. 3 is a flow chart illustrating another method for extracting speech features based on artificial intelligence according to embodiments of the present disclosure. As illustrated in FIG. 3, the method includes followings.

At act 201, the gated convolution neural network is established.

Figure 4:
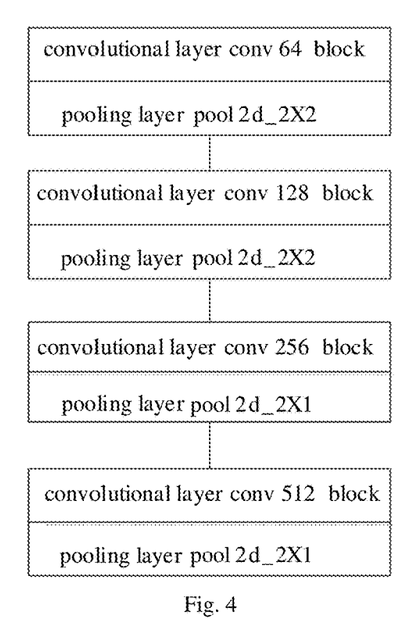
FIG. 4 is a schematic diagram illustrating a configuration of a gated convolution neural network.

In detail, the gated convolution neural network includes a plurality of convolutional layers and a plurality of pooling layers. The plurality of pooling layers are connected at behind of the plurality of convolutional layers respectively. In order to illustrate a structure of the gated convolution neural network clearly, embodiments of the present disclosure provide a possible implementation. FIG. 4 is a schematic diagram illustrating a configuration of a gated convolution neural network. As illustrated in FIG. 4, the configuration includes:

a convolutional layer "conv64block",
a pooling layer "pool2d_2×2",
a convolutional layer "conv128block",
a pooling layer "pool2d_2×2",
a convolutional layer "conv256block",
a pooling layer "pool2d_2×1",
a convolutional layer "conv512block", and
a pooling layer "pool2d_2×1".

The gated convolution neural network includes four convolutional layers. A pooling layer is connected immediately at behind of each convolutional layer. The structure of each convolutional layer is characteristic of an output gate algorithm. In order to illustrate the output gate algorithm clearly, the structure of each convolutional layer is further described. As a possible implementation, FIGS. 5 to 8 are schematic diagrams illustrating the convolutional layers of the gated convolution neural network.

As illustrate in FIGS. 5 to 8, a character "copy" represents that an input is copied into several copies. Each number behind the character "copy", such as 1, 2, 3 and 4, indicates that an input is from a corresponding convolutional layer having the same number. A character "multi" represents that inputs are multiplied. A character "conv2d" represent a convolutional layer. Each number behind the character "conv2d", such as 64, 128, 256 and 512, represents the number of filters included in a corresponding convolutional layer, and a character "3×3" represents a size of a convolution kernel. Each number behind a character "-" represent a serial number for distinguishing with each other. For example, two characters "tan h-1" and "tan h-2" are same activation functions, but are distinguished with different serial numbers.

Figure 5:
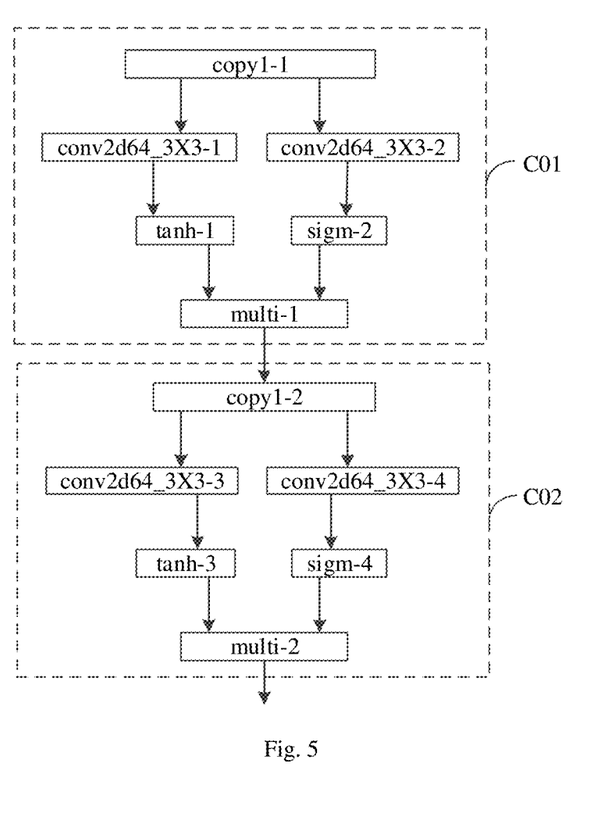
FIG. 5 is a schematic diagram illustrating a convolutional layer conv64block of a gated convolution neural network.

In detail, in the gated convolution neural network, a convolutional layer conv64block is described firstly. The convolutional layer conv64block is composed of DAGs. FIG. 5 is a schematic diagram illustrating a convolutional layer conv64block of a gated convolution neural network.

As illustrated in FIG. 5, the convolutional layer conv64block includes two layers. The two layers are illustrated as a C01 layer and a C02 layer. An output of the C01 layer is an input of the C02 layer. Each of the C01 layer and the C02 layer includes a first channel and a second channel. Each of the first channel and the second channel is provided with a non-linear activation function.

In detail, in the C01 layer, each of the first channel and the second channel includes 64 filters. The size of the convolution kernel of each filter is 3×3. The non-linear activation function of the first channel is a hyperbolic tangent function tan h and the non-linear activation function of the second channel is a sigmoid function. The outputs from the first channel and the second channel are multiplied as the output of the C01 layer. The output of the C01 layer is the input of the C02 layer. The structure of the C02 layer is the same with that of the C01 layer, which is not elaborated herein. Therefore, the convolutional layer conv64block illustrated in FIG. 5 is established by the C01 layer and the C02 layer.

Further, the pooling layer pool2d_2×2 is described. The down-sampling is performed for the pooling layer. In detail, the down-sampling with the down-sampling rate of ½ is performed both in time domain and in frequency domain for the pooling layer pool2d_2×2.

Figure 6:
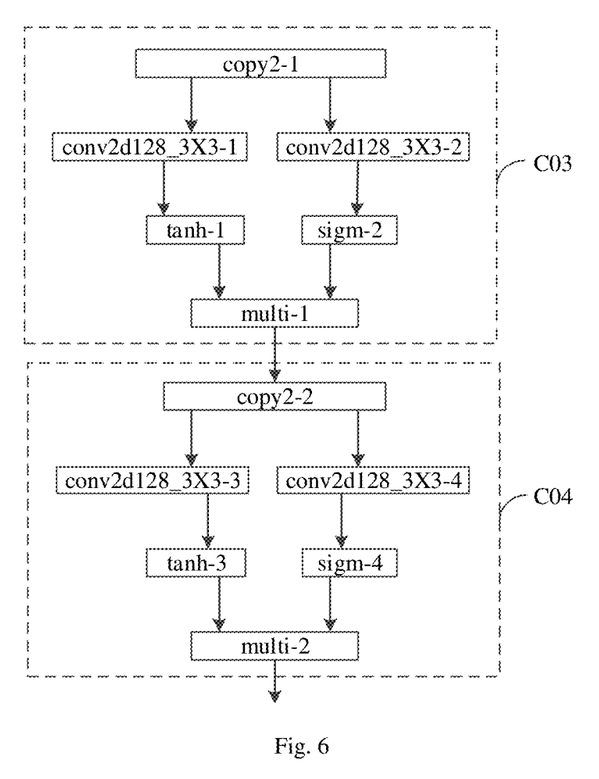
FIG. 6 is a schematic diagram illustrating a convolutional layer conv128block of a gated convolution neural network.

Further, a convolutional layer conv128block is described. The convolutional layer conv128block is composed of DAGs. FIG. 6 is a schematic diagram illustrating a convolutional layer conv128block of a gated convolution neural network.

As illustrated in FIG. 6, the convolutional layer conv128block includes two layers. The two layers are illustrated as a C03 layer and a C04 layer. An output of the C03 layer is an input of the C04 layer. Each of the C03 layer and the C04 layer includes a first channel and a second channel. Each of the first channel and the second channel is provided with a non-linear activation function.

In detail, in the C03 layer, each of the first channel and the second channel includes 128 filters. The size of the convolution kernel of each filter is 3×3. The non-linear activation function of the first channel is a hyperbolic tangent function tan h and the non-linear activation function of the second channel is a sigmoid function sigm. The outputs from the first channel and the second channel are multiplied as the output of the C03 layer. The output of the C03 layer is the input of the C04 layer. The structure of the C04 layer is the same with that of the C03 layer, which is not elaborated herein. Therefore, the convolutional layer conv128block illustrated in FIG. 6 is established by the C03 layer and the C04 layer.

Further, the pooling layer pool2d_2×2 is described. The down-sampling is performed for the pooling layer. In detail, the down-sampling with the down-sampling rateC of ½ is performed both in time domain and in frequency domain for the pooling layer pool2d_2×2.

Figure 7:
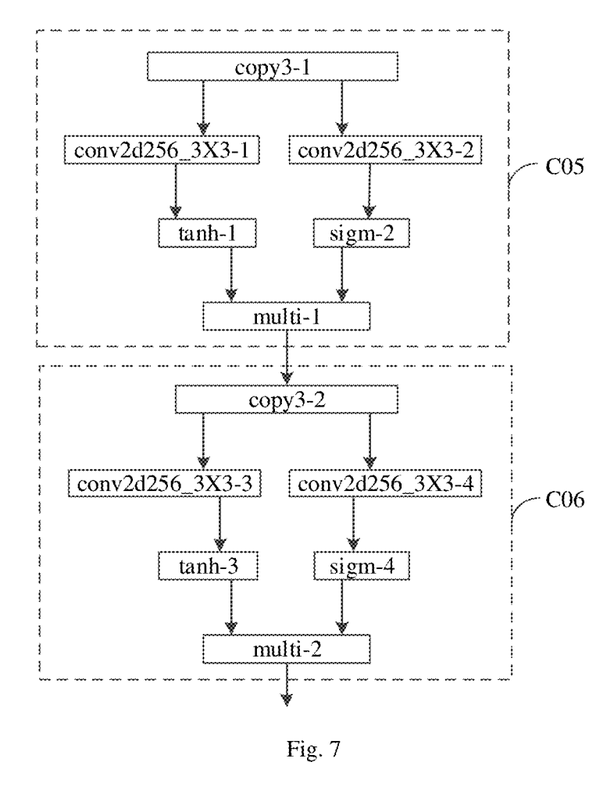
FIG. 7 is a schematic diagram illustrating a convolutional layer conv256block of a gated convolution neural network.

Further, a convolutional layer conv256block is described. The convolutional layer conv256block is composed of DAGs. FIG. 7 is a schematic diagram illustrating a convolutional layer conv256block of a gated convolution neural network.

As illustrated in FIG. 7, the convolutional layer conv256block includes two layers. The two layers are illustrated as a C05 layer and a C06 layer. An output of the C05 layer is an input of the C06 layer. Each of the C05 layer and the C06 layer includes a first channel and a second channel. Each of the first channel and the second channel is provided with a non-linear activation function.

In detail, in the C05 layer, each of the first channel and the second channel includes 256 filters. The size of the convolution kernel of each filter is 3×3. The non-linear activation function of the first channel is a hyperbolic tangent function tan h and the non-linear activation function of the second channel is a sigmoid function sigm. The outputs from the first channel and the second channel are multiplied as the output of the C05 layer. The output of the C05 layer is the input of the C06 layer. The structure of the C06 layer is the same with that of the C05 layer, which is not elaborated herein. Therefore, the convolutional layer conv256block illustrated in FIG. 7 is established by the C05 layer and the C06 layer.

Further, the pooling layer pool2d_2×1 is described. The down-sampling is performed for the pooling layer. In detail, the down-sampling with the down-sampling rate of ½ is performed in frequency domain for the pooling layer pool2d_2×1.

Figure 8:
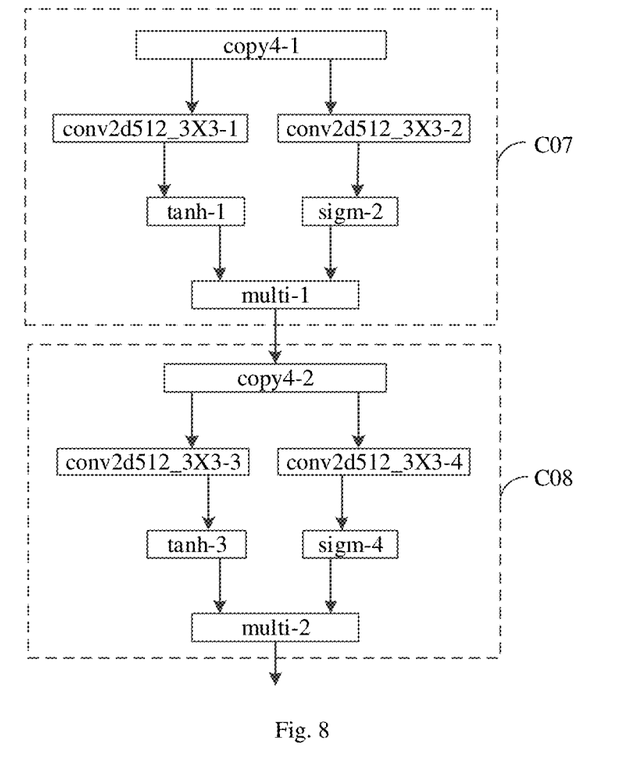
FIG. 8 is a schematic diagram illustrating a convolutional layer conv512block of a gated convolution neural network.

Further, a convolutional layer conv512block is described. The convolutional layer conv512block is composed of DAGs. FIG. 8 is a schematic diagram illustrating a convolutional layer conv512block of a gated convolution neural network.

As illustrated in FIG. 8, the convolutional layer conv512block includes two layers. The two layers are illustrated as a C07 layer and a C08 layer. An output of the C07 layer is an input of the C08 layer. Each of the C07 layer and the C08 layer includes a first channel and a second channel. Each of the first channel and the second channel is provided with a non-linear activation function.

In detail, in the C07 layer, each of the first channel and the second channel includes 512 filters. The size of the convolution kernel of each filter is 3×3. The non-linear activation function of the first channel is a hyperbolic tangent function tan h and the non-linear activation function of the second channel is a sigmoid function sigm. The outputs from the first channel and the second channel are multiplied as the output of the C07 layer. The output of the C07 layer is the input of the C08 layer. The structure of the C08 layer is the same with that of the C07 layer, which is not elaborated herein. Therefore, the convolutional layer conv512block illustrated in FIG. 8 is established by the C07 layer and the C08 layer.

Further, the pooling layer pool2d_2×1 is described. The down-sampling is performed for the pooling layer. In detail, the down-sampling with the down-sampling rate of ½ is performed in frequency domain for the pooling layer pool2d_2×1.

Figure 9:
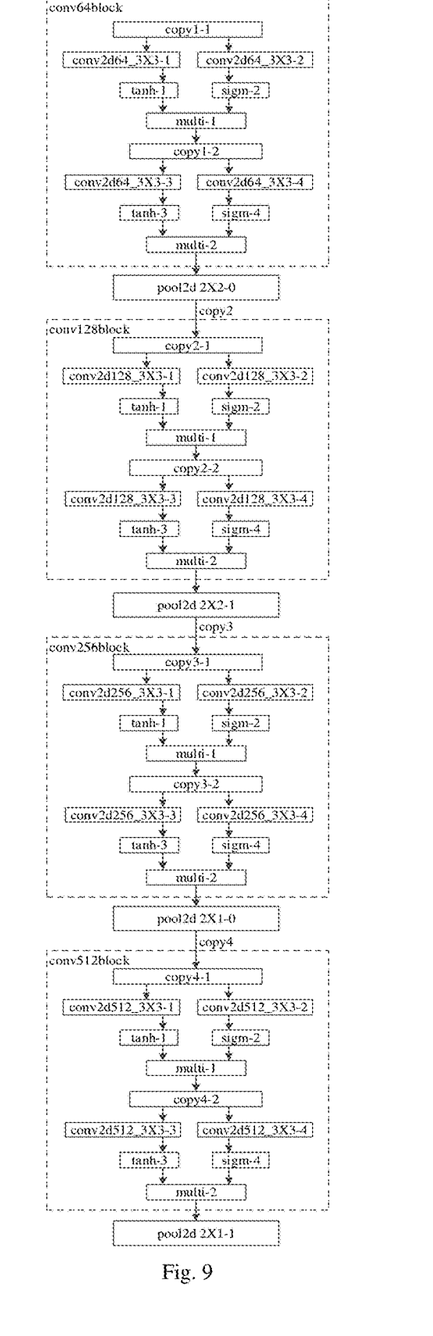
FIG. 9 is a schematic diagram illustrating a gated convolution neural network.

In order to illustrate the structure of the gated convolution neural network clearly, embodiments provides a possible implementation. FIG. 9 is a schematic diagram illustrating a gated convolution neural network.

In the gated convolution neural network illustrated in FIG. 9, four down-samplings are performed for the pooling layers. A summed times of performing the down-sampling in time domain is generally less than that in frequency domain. In detail, as illustrated in FIG. 9, 2 times of the down-samplings are performed in time domain to obtain a summed down-sampling rate of ¼, while 4 times of the down-samplings are performed in frequency domain to obtain a summed down-sampling rate of ¹⁄₁₆. It can be seen that a summed sampling rate in time domain is larger than the summed sampling rate in frequency domain, and the summed down-sampling rate in time domain is smaller than that in frequency domain. In addition, in the gated convolution neural network illustrated in FIG. 9, four convolutional layers are used. Each of the four convolutional layers includes two layers. The output of the former layer is the input of the adjacent posterior layer. Each of the two layers includes two channels. Each of the two channels is provided with a different non-linear activation function.

At act 202, the gated convolution neural network that has been set is trained.

At act 203, the speech features are obtained by inputting the spectrum program of the speech to be recognized into the gated convolution neural network.

In detail, it is required to plot the spectrum program of the speech to be recognized. The speech to be recognized is sampled by a preset sampling period to obtain voice frames. The voice frames are filtered with a filter group having the preset number of filters to obtain the spectrum components of the voice frames. For the voice frames, the Fourier transform is performed to the spectrum components to obtain the spectrum values of the voice frames. The spectrum program is obtained according to the spectrum values. Horizontal coordinates of the spectrum program represent time corresponding to the voice frames, longitudinal coordinates of the spectrum program represent frequency components of the voice frames included in the voice frames, and values of intersections between horizontal coordinates and longitudinal coordinates represent the spectrum values (i.e. energies). The spectrum program is input into the gated convolution neural network to obtain the speech features.

At act 204, a speech classification is performed by inputting the speech features into an acoustic model.

In detail, the acoustic model may be one taking a phoneme as a modeling unit or may be one taking a word as a modeling unit, which is not limited in embodiments. It is to be noted that, the summed down-sampling rate in time domain of the gated convolution neural network is determined by a granularity of performing the speech classification to the speech to be recognized through this acoustic model. The granularity includes: a word or a phoneme.

For example, if the granularity of performing the speech classification through the acoustic model is the phoneme, the summed down-sampling rate of ¼ is performed in time domain. If the granularity of performing the speech classification through the acoustic mode is the word, the summed down-sampling rate of ⅛ is performed in time domain.

In embodiments, by performing the spectrum analysis to the speech to be recognized, the spectrum program of the speech to be recognized is obtained; and by extracting the features of the spectrum program through using the gated convolution neural network, the speech features of the speech to be recognized are obtained. As the spectrum program can describe the speech to be recognized in a form of image, and the gated convolution neural network is an effective method for processing images, the speech features extracted with this method may accurately describe characteristics of the speech. By performing the speech recognition on the extracted speech features, it may solve a technical problem that an accuracy of speech recognition is relatively low due to an absence of an impactful extraction of the speech features in related arts.

In order to achieve above embodiments, embodiments of the present disclosure further provide a device for extracting speech features based on artificial intelligence.

Figure 10:
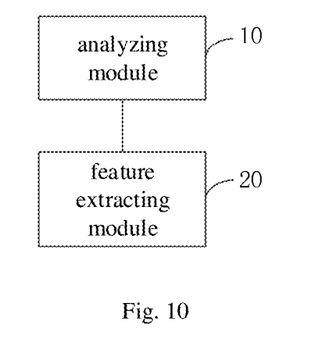
FIG. 10 is a schematic diagram illustrating a device for extracting speech features based on artificial intelligence according to embodiments of the present disclosure.

FIG. 10 is a schematic diagram illustrating a device for extracting speech features based on artificial intelligence according to embodiments of the present disclosure.

As illustrated in FIG. 10, the method includes an analyzing module 10 and a feature extracting module 20.

The analyzing module 10 is configured to perform a spectrum analysis on a speech to be recognized, to obtain a spectrum program of the speech to be recognized.

The feature extracting module 20 is configured to extract features of the spectrum program by using an gated convolution neural network to obtain the speech features of the speech to be recognized.

Further, in a possible implementation of embodiments of the present disclosure, the gated convolution neural network includes a plurality of convolutional layers. A corresponding pooling layer is connected at behind of each convolutional layer. Each of the convolutional layers includes at least two layers. An output of a former of the at least two layers is an input of an adjacent posterior of the at least two layers. Each of the at least two layers includes a first channel and a second channel. The first channel and the second channel employ different non-linear activation functions. The non-linear activation function of the first channel is a hyperbolic tangent function, and the non-linear activation function of the second channel is a sigmoid function sigm. The pooling pool is configured to perform a down-sampling in time domain and/or in frequency domain. A summed down-sampling rate in time domain is smaller than a summed down-sampling rate in frequency domain, on each pooling layer. A summed down-sampling rate in time domain is determined according to a granularity of performing a speech classification to the speech to be recognized.

Further, in the gated convolution neural network, the number of filters in a posterior convolutional layer is integer multiple of that in an adjacent former convolutional layer.

It can be seen that, by performing the spectrum analysis to the speech to be recognized, the spectrum program of the speech to be recognized is obtained; and by extracting the features of the spectrum program through using the gated convolution neural network, the speech features of the speech to be recognized are obtained. As the spectrum program can describe the speech to be recognized in a form of image, and the gated convolution neural network is an effective method for processing images, the speech features extracted with this manner may accurately describe characteristics of the speech. By performing the speech recognition on the extracted speech features, it may solve a technical problem that an accuracy of speech recognition is relatively low due to an absence of an impactful extraction of the speech features in related arts.

It is to be illustrated that, descriptions and illustrations to above embodiments corresponding to the method are suitable for embodiments corresponding to the device, which are not elaborated herein.

Figure 11:
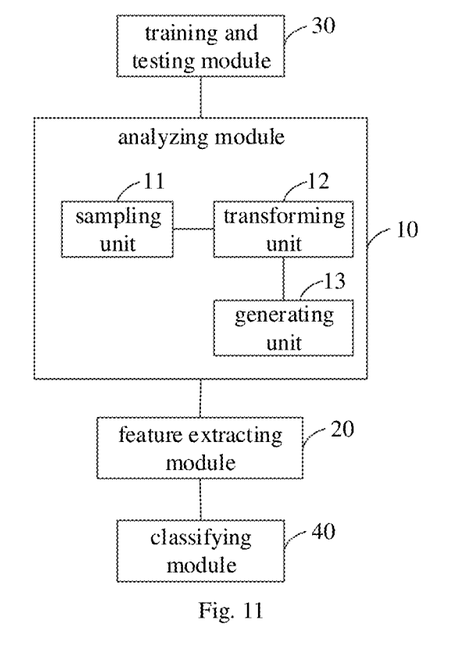
FIG. 11 is a schematic diagram illustrating another device for extracting speech features based on artificial intelligence according to embodiments of the present disclosure.

Based on the above embodiments, embodiments of the present disclosure further provide a possible implementation of the device. FIG. 11 is a schematic diagram illustrating another device for extracting speech features based on artificial intelligence according to embodiments of the present disclosure. As illustrated in FIG. 11, on the basis of the above embodiments, the analyzing module 10 includes a sampling unit 11, a transforming unit 12 and a generating unit 13.

The sampling unit 11 is configured to sample the speech to be recognized by a preset sampling period to obtain the voice frames; and to filter the voice frames to obtain spectrum components included in the voice frames.

The transforming unit 12 is configured to perform a Fourier transform on the voice frames included in the speech to be recognized to obtain spectrum values of the voice frames.

The generating unit 13 is configured to generate the spectrum program according to the spectrum values.

Horizontal coordinates of the spectrum program represent time corresponding to the voice frames, longitudinal coordinates of the spectrum program represent frequency components corresponding to the voice frames, and values of intersections between horizontal coordinates and longitudinal coordinates represent the spectrum values.

Further, the device includes: a training and testing module 30 and a classifying module 40.

The training and testing module 30 is configured to train and test the gated convolution neural network.

The classifying module 40 is configured to perform a speech classification by inputting the speech features into an acoustic model.

It is to be illustrated that, descriptions and illustrations to embodiments corresponding to the method are also suitable for embodiments corresponding to the device, which are not elaborated herein.

In embodiments of the present disclosure, by performing the spectrum analysis to the speech to be recognized, the spectrum program of the speech to be recognized is obtained; and by extracting the features of the spectrum program through using the gated convolution neural network, the speech features of the speech to be recognized are obtained. As the spectrum program can describe the speech to be recognized in a form of image, and the gated convolution neural network is an effective method for processing images, the speech features extracted with this manner may accurately describe characteristics of the speech. By performing the speech recognition on the extracted speech features, it may solve a technical problem that an accuracy of speech recognition is relatively low due to an absence of an impactful extraction of the speech features in related arts.

In order to achieve above embodiments, embodiments of the present disclosure further provide another device for extracting speech features based on artificial intelligence. The device includes a memory, a processor and computer programs stored in the memory and executable by the processor. When the computer programs are executed by the processor, the method according to above embodiments is achieved.

In order to achieve above embodiments, embodiments of the present disclosure further provide a non-transitory computer readable storage medium with computer programs stored. When the computer programs are executed by a processor, the method according to above embodiments is achieved.

In order to achieve above embodiments, embodiments of the present disclosure further provide a computer program product. When instructions in the computer program product are executed by a processor, the method according to above embodiments is executed.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means at least two, such as two, three etc., unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but not an exhaustive list: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for extracting speech features based on artificial intelligence, wherein the speech features are used for speech recognition, and the method is performed by at least one computing device and comprises:
    performing, by the at least one computing device, a spectrum analysis on a speech to be recognized, to obtain a spectrum program of the speech to be recognized; and
    extracting, by the at least one computing device, features of the spectrum program by using a gated convolution neural network to obtain speech features of the speech to be recognized;
    wherein the gated convolution neural network comprises a plurality of convolutional layers, a pooling layer is connected at behind of each of the plurality of convolutional layers; each of the plurality of convolutional layers comprises at least two layers, an output of a former of the at least two layers is an input of an adjacent posterior of the at least two layers, each of the at least two layers comprises a first channel and a second channel, and the first channel and the second channel employ different non-linear activation functions.

2. The method according to claim 1, wherein the non-linear activation function of the first channel is a hyperbolic tangent function, and the non-linear activation function of the second channel is a sigmoid function.

3. The method according to claim 1, wherein performing, by the at least one computing device, a spectrum analysis on a speech to be recognized, to obtain a spectrum program of the speech to be recognized comprises:
    performing, by the at least one computing device, a Fourier transform on voice frames comprised in the speech to be recognized to obtain spectrum values of the voice frames; and
    generating, by the at least one computing device, the spectrum program according to the spectrum values;
    wherein horizontal coordinates of the spectrum program represent time corresponding to the voice frames, longitudinal coordinates of the spectrum program represent frequency components of the voice frames, and values of intersections between horizontal coordinates and longitudinal coordinates represent the spectrum values.

4. The method according claim 3, before performing, by the at least one computing device, a Fourier transform on voice frames comprised in the speech to be recognized to obtain spectrum values of the voice frames, further comprising:
    sampling, by the at least one computing device, the speech to be recognized by a preset sampling period to obtain the voice frames; and
    filtering, by the at least one computing device, the voice frames to obtain spectrum components comprised in the voice frames.

5. The method according to claim 1, wherein the pooling layer is configured to perform a down-sampling in time domain and/or in frequency domain;
    a summed down-sampling rate in time domain is smaller than a summed down-sampling rate in frequency domain, on each pooling layer.

6. The method according to claim 5, wherein the summed down-sampling rate in time domain is determined according to a granularity of performing a speech classification on the speech to be recognized.

7. The method according to claim 1, wherein in the gated convolution neural network, the number of filters in a posterior convolutional layer is integer multiple of that in an adjacent former convolutional layer; and convolution kernels of the plurality of convolutional layers of the gated convolution neural network have the same size.

8. The method according to claim 1, before extracting, by the at least one computing device, features of the spectrum program by using a gated convolution neural network, further comprising:
training and testing, by the at least one computing device, the gated convolution neural network.

9. The method according to claim 1, after extracting, by the at least one computing device, features of the spectrum program by using a gated convolution neural network, further comprising:
performing, by the at least one computing device, a speech classification by inputting the speech features into an acoustic model.

10. A device for extracting speech features based on artificial intelligence, comprising: a memory, a processor and computer programs stored in the memory and executable by the processor, wherein the processor is configured to execute the computer programs to perform acts of:
performing a spectrum analysis on a speech to be recognized, to obtain a spectrum program of the speech to be recognized; and
extracting features of the spectrum program by using a gated convolution neural network to obtain speech features of the speech to be recognized;
wherein the gated convolution neural network comprises a plurality of convolutional layers, a pooling layer is connected at behind of each of the plurality of convolutional layers; each of the plurality of convolutional layers comprises at least two layers, an output of a former of the at least two layers is an input of an adjacent posterior of the at least two layers, each of the at least two layers comprises a first channel and a second channel, and the first channel and the second channel employ different non-linear activation functions.

11. The device according to claim 10, wherein the non-linear activation function of the first channel is a hyperbolic tangent function, and the non-linear activation function of the second channel is a sigmoid function.

12. The device according to claim 10, wherein the processor is configured to perform a spectrum analysis on a speech to be recognized by acts of:
performing a Fourier transform on voice frames comprised in the speech to be recognized to obtain spectrum values of the voice frames; and
generating the spectrum program according to the spectrum values; wherein horizontal coordinates of the spectrum program represent time corresponding to the voice frames, longitudinal coordinates of the spectrum program represent frequency components of the voice frames, and values of intersections between horizontal coordinates and longitudinal coordinates represent the spectrum values.

13. The device according to claim 12, wherein the processor is further configured to perform acts of:
sampling the speech to be recognized by a preset sampling period to obtain the voice frames; and
filtering the voice frames to obtain spectrum components comprised in the voice frames.

14. The device according to claim 10, wherein the pooling layer is configured to perform a down-sampling in time domain and/or in frequency domain;
a summed down-sampling rate in time domain is smaller than a summed down-sampling rate in frequency domain, on each pooling layer.

15. The device according to claim 14, wherein the summed down-sampling rate in time domain is determined according to a granularity of performing a speech classification on the speech to be recognized.

16. The device according to claim 10, wherein in the gated convolution neural network, the number of filters in a posterior convolutional layer is integer multiple of that in an adjacent former convolutional layer; and convolution kernels of the plurality of convolutional layers of the gated convolution neural network have the same size.

17. The device according to claim 10, wherein the processor is further configured to perform acts of:
training and testing the gated convolution neural network.

18. The device according to claim 10, wherein the processor is further configured to perform acts of:
performing a speech classification by inputting the speech features into an acoustic model.

19. A non-transitory computer readable storage medium, with computer programs stored, wherein the computer programs are executed by a processor to achieve a method for extracting speech features based on artificial intelligence, the speech features are used for speech recognition, and the method comprises:
performing a spectrum analysis on a speech to be recognized, to obtain a spectrum program of the speech to be recognized; and
extracting features of the spectrum program by using a gated convolution neural network to obtain speech features of the speech to be recognized;
wherein the gated convolution neural network comprises a plurality of convolutional layers, a pooling layer is connected at behind of each of the plurality of convolutional layers; each of the plurality of convolutional layers comprises at least two layers, an output of a former of the at least two layers is an input of an adjacent posterior of the at least two layers, each of the at least two layers comprises a first channel and a second channel, and the first channel and the second channel employ different non-linear activation functions.

20. The non-transitory computer readable storage medium according to claim 19, wherein performing a spectrum analysis on a speech to be recognized, to obtain a spectrum program of the speech to be recognized comprises:
performing a Fourier transform on voice frames comprised in the speech to be recognized to obtain spectrum values of the voice frames; and
generating the spectrum program according to the spectrum values; wherein horizontal coordinates of the spectrum program represent time corresponding to the voice frames, longitudinal coordinates of the spectrum program represent frequency components of the voice frames, and values of intersections between horizontal coordinates and longitudinal coordinates represent the spectrum values.

* * * * *